Patented June 18, 1946

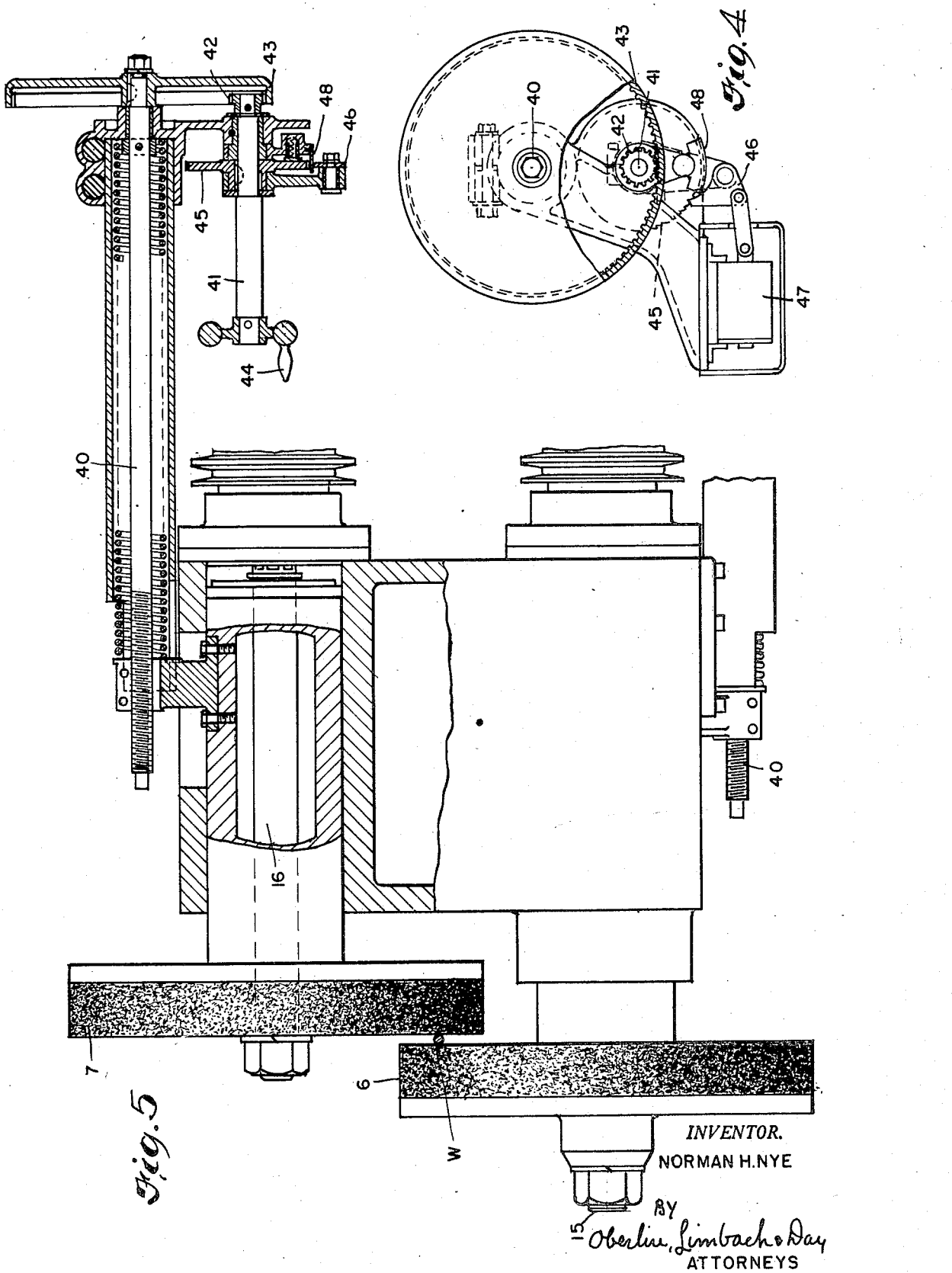

2,402,293

UNITED STATES PATENT OFFICE 2,402,293

DIMENSION INDICATING AND CONTROL DEVICE

Norman H. Nye, Cuyahoga Falls, Ohio, assignor to The Vaughn Machinery Company, Cuyahoga Falls, Ohio, a corporation of Ohio Application April 7, 1944, Serial No. 529,991

13 Claims. (Cl. 51—165)

The present improvements, relating as indicated to dimension indicating and control devices, have more particular regard to devices of the character in question designed for use in connection with surface conditioning mechanism applied to continuously moving work-pieces, such as wire or the like.

One form of such surface conditioning mechanism is disclosed in the co-pending application of N. H. Nye and E. J. McIlvried, filed April 10, 1942, Serial No. 438,454, and which matured as Patent No. 2,355,174 on August 8, 1944, in which a length of continuously moving wire or similar elongated work-piece is rapidly rotatively oscillated about its axis while grinding or equivalent mechanical surface conditioning means are caused to contact with such oscillating portion or length of the wire. However, the present improvements are applicable to indicate and control the dimension of such a continuously moving work-piece irrespective of whether it be thus oscillated or rotated about its axis, and irrespective of the particular means employed to produce such oscillation or rotation.

One principal object of the invention is to utilize for the stated purpose a measuring instrument of the pneumatic type, i. e. in which changes produced by the tool in the work-piece affect a fluid pressure responsive device which serves either to indicate such changes or to adjust the position of such tool, or both.

A further object is to provide means whereby the longitudinal travel of the work-piece as well as the operation of such tool will be interrupted in the event the change produced by the tool in the work-piece is less than that intended. A further object is to provide a dimension indicating and control device for use with a continuously moving work-piece which will be extremely sensitive and capable of operating where such movement is at a high rate of speed, e. g. on the order of one hundred feet per minute.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 4 is an end view of the tool adjusting device; and

Fig. 5 is a vertical section thereof and of the associated grinding tools which constitute the specific surface conditioning mechanism applied to the wire in the illustrative apparatus of Fig. 1.

Figure 1:
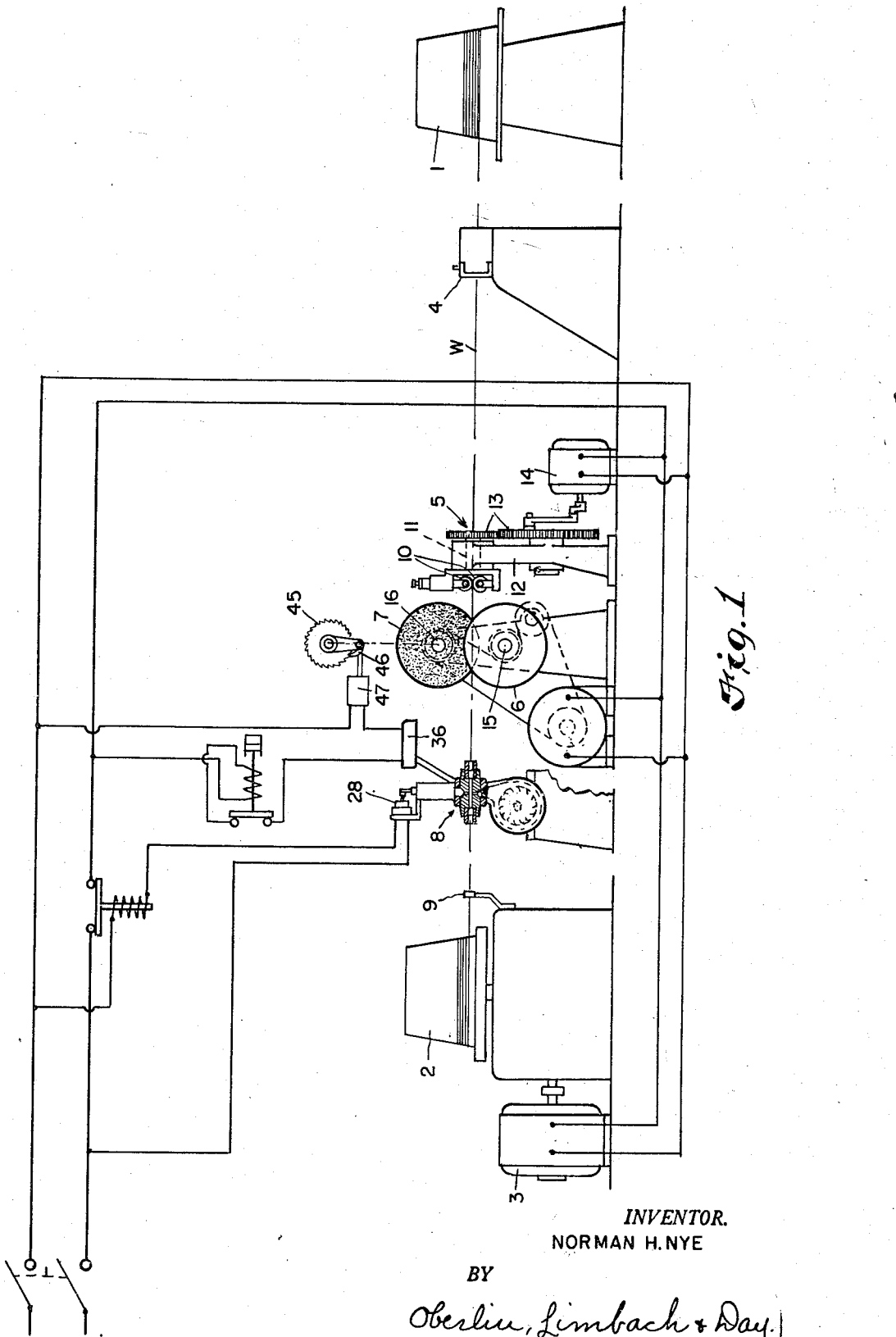
Fig. 1 is a side elevational view more or less diagrammatic in character illustrating an apparatus for surface conditioning a continuously moving wire, and in association therewith my present improved dimension indicating and control device.

The surface conditioning apparatus chosen for the purpose of illustration in Fig. 1 is substantially that of the above-identified co-pending application in which, as previously stated, a length of continuously moving wire W or similar elongated work-piece is rapidly rotatively oscillated about its axis while grinding or equivalent mechanical surface conditioning means are caused to contact with such oscillating portion or length of the wire. The wire, by which term it is intended to include as well rod or equivalent longitudinally extended work-piece, is drawn from a conventional reel 1 through the various devices which will now be described, by means of a take-up reel 2 shown as being driven by an electric motor 3. Ordinarily the wire will be first passed through a drawing die 4 which serves slightly to reduce the diameter thereof and render the cross-section more nearly circular than in the case of the stock material supplied to reel 1. Thereupon the wire passes in succession through an oscillating device 5, between opposed grinding wheels 6 and 7 and thence through the dimension indicating and control device 8, with which the present improvements are primarily concerned. Desirably, although not necessarily, a guide 9 will be interposed between the latter and the take-up drum or reel 2.

The oscillating device 5 may take on various forms, that illustrated comprising a pair of gripper rolls 10, 10 adapted to define the path of travel of and frictionally engage the wire. These rolls which are relatively adjustable so as to grip the wire with the required degree of pressure, are carried by a tubular member 11 journalled in a suitable support 12, said member being connected through suitable gearing 13 with a motor 14 whereby said member is rapidly oscillated through at least 180°. Such oscillation of the member 11 and thus of the gripping rolls will cause the travelling length of the wire or rod W which lies between the supply and take-up means, or specifically the portion thereof which lies between the die 4 and guide 9, to be likewise torsionally oscillated through at least 180° at each oscillation.

The two grinding wheels 6 and 7 which constitute the illustrated surface conditioning means are carried by approximately parallel spindles 15 and 16 disposed transversely of the line of travel of the wire, one above and the other below such line. Said grinding wheels are furthermore disposed so that they partially overlap (see Fig. 4) and contact opposite sides of the wire on a chordal line. As will be presently explained in more detail, one or both of the spindles 15 and 16 will be axially adjustable, or rather such wheels will be thus adjustable on said spindles, so that the space between the wire engaging faces of the grinding wheels 6 and 7 may be correspondingly varied.

From the foregoing arrangement of work-piece oscillating means and grinding means it will be seen that as a work-piece, e. g. the wire W, advances longitudinally from supply to take-up means it will at the same time be oscillated to a sufficient extent to bring its entire surface into contact with the opposed overlapping faces of the grinding wheels 6 and 7. Accordingly by proper adjustment of such wheels the work-piece will be ground down, not only to remove all surface imperfections, but to leave the work-piece of predetermined diameter. Also by employing proper material for the grinding wheels such surface may at the same time be highly polished.

Figure 2:
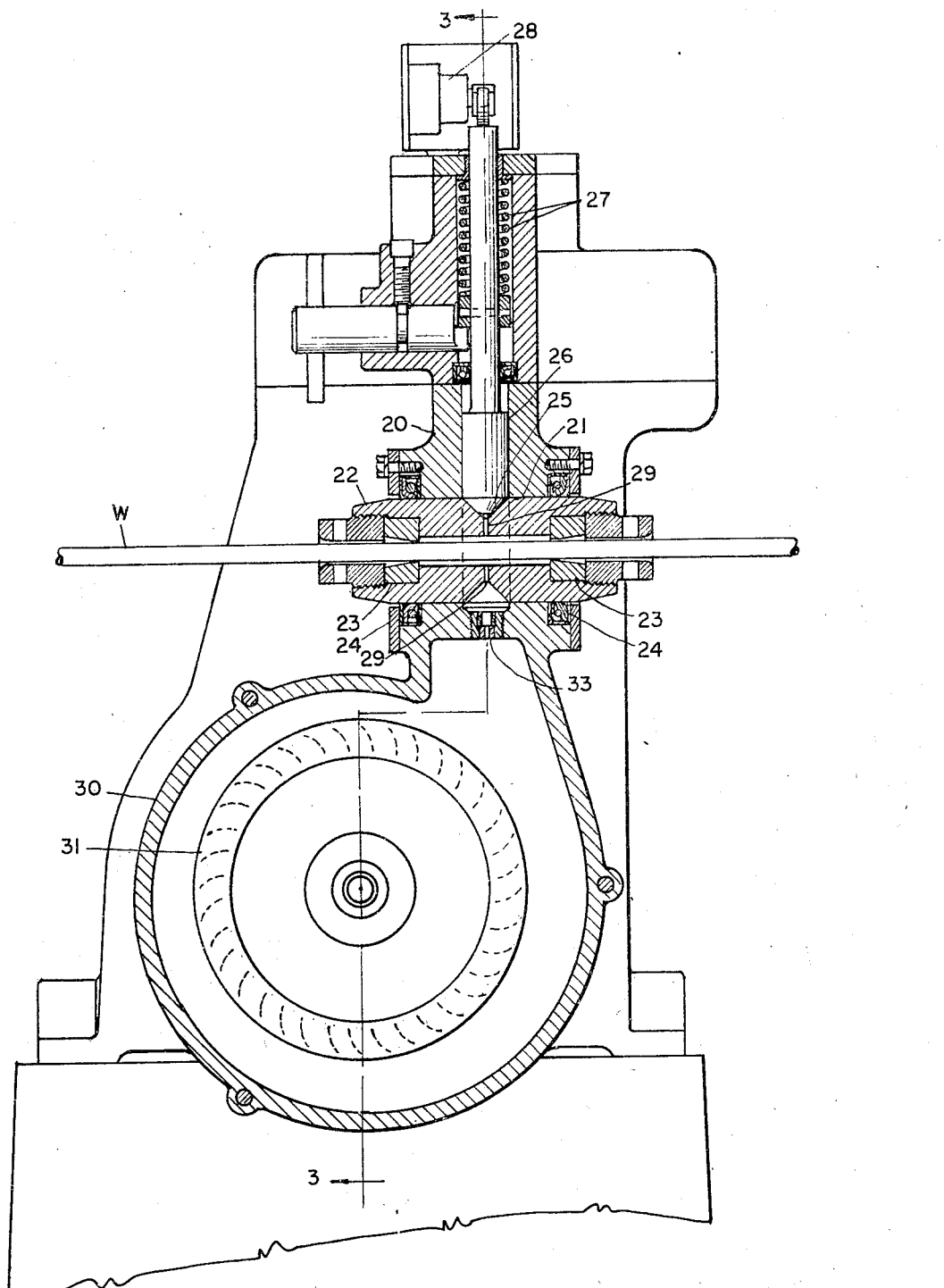
Fig. 2 is a longitudinal section through such device, the plane of the section coinciding with the axis of the continuously moving wire or equivalent work-piece.
Figure 3:
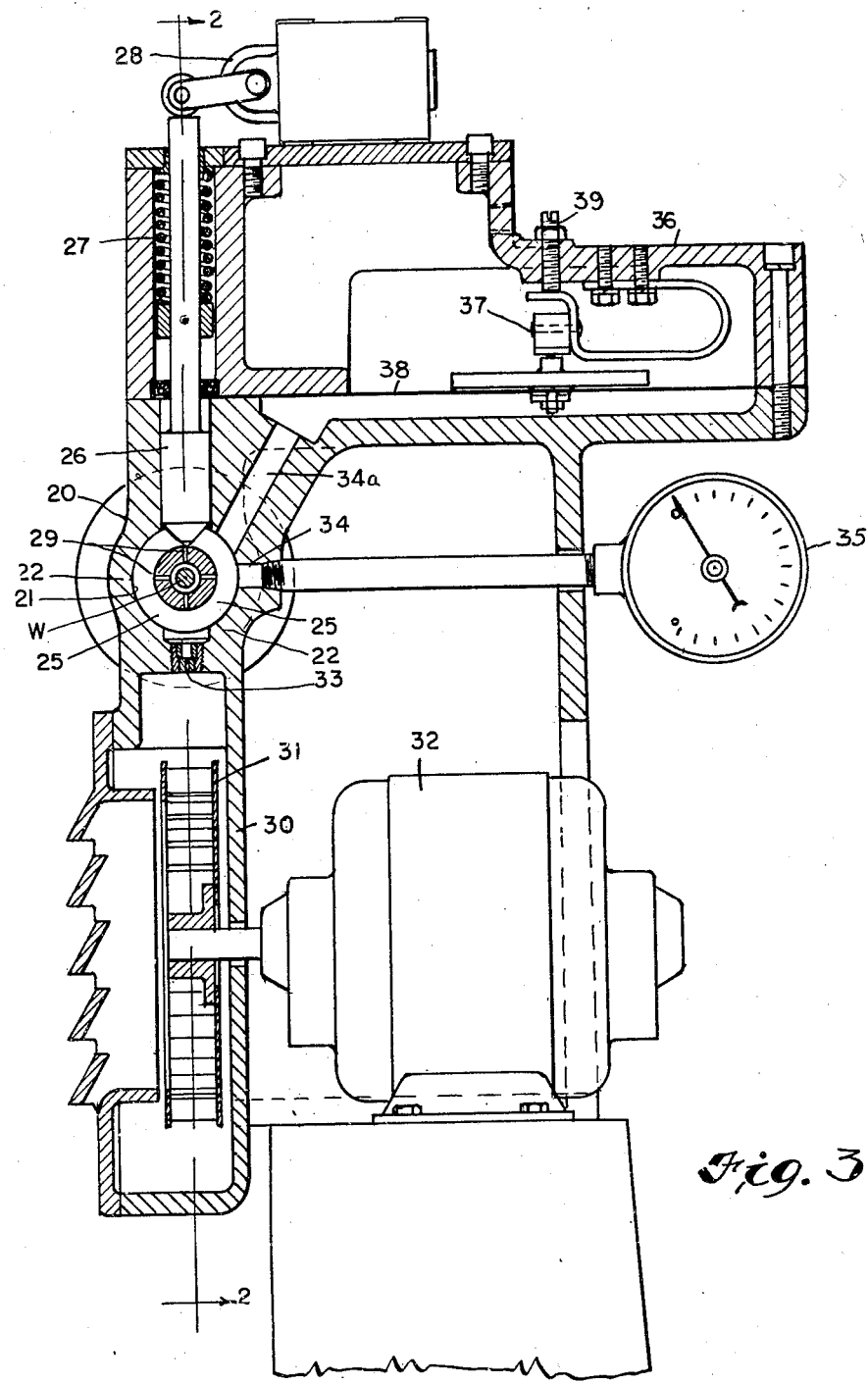
Fig. 3 is a transverse section of the device, the plane of the section being indicated by line 3—3 Fig. 2.

The dimension indicating and control device through which the wire passes immediately following its engagement with the grinding discs or wheels 6 and 7, such wheels illustrating any suitable form of work-piece conditioning means, is illustrated in detail in Figs. 2 and 3. As there shown, such device comprises a housing 20 having a cylindrical bore 21 in which is fitted a tubular member 22, such tubular member being axially aligned with the moving work-piece, e. g. wire W. Firmly secured in the respective ends of the member are dies 23, the openings in which are accurately gauged so as to provide a predetermined clearance for the wire when the latter is of desired cross-section. While member 22 is closely fitted in the bore 21, and sealing rings 24 are in addition provided adjacent its respective ends, said member is nevertheless capable of being displaced longitudinally of said bore by excessive frictional engagement of the wire with said dies 23. In other words, if the diameter of the wire is not reduced sufficiently by the grinding means the effect of its resulting frictional engagement with the dies will be to displace the member 22 in the direction in which the wire is travelling.

Member 22 is formed approximately mid-way of its ends with an encircling groove 25, preferably of V cross-section, as shown, and reciprocably mounted in housing 20 is a latch 26 the inner end of which is of corresponding form and adapted to engage such groove 25 under the pressure of a spring 27. Plunger or latch 26 not only serves to locate member 23 in its proper operative position in bore 21 but displacement of the latch necessarily follows upon displacement of the member due to excessive frictional engagement of the wire therewith, as just described above. Connected with the latch is an electrical switch 28 which either directly or through a relay circuit controls the power line for the motor 3 which drives take-up reel or drum 2. Actually, as shown diagrammatically on Fig. 1, the power line thus controlled may serve all of the motors which drive the several associated devices or mechanisms. The effect accordingly of the displacement of latch 26 will be to stop the entire machine.

A series of radial apertures 29 provide for free fluid communication at all times between the space defined by the groove 25 in tubular member 22 and the hollow interior of said member lying between the dies 23.

Conveniently located immediately below housing 20 is a fan chamber 30 and rotary fan or impeller 31, driven by a motor 32, whereby air under substantially constant pressure may be supplied through an orifice 33 in said housing to the annular V-shaped space constituted by the groove 25 in member 22. Such orifice 33 is desirably formed in an interchangeable bushing which serves to regulate the supply of the pressure fluid to the annular chamber in question. In any event, the aperture is gauged so that when the work-piece W as it passes through the dies 23 will cause a predetermined pressure to be built up within member 22, where such work-piece is of desired diameter. However, upon a slight increase in such diameter such built-up pressure will likewise be increased by cutting off the escape of pressure fluid through the dies around the work-piece.

Leading from the housing 20 are two ducts 34 and 34a, the inner ends of which are disposed so as to communicate with the annular space provided by groove 25 in member 22 when the latter is in its normal position in bore 21, i. e. with latch 26 in engagement with such groove. The first of these ducts leads to a pressure indicator 35 of any type suitable for registering slight changes in pressure, whereby the pressure established in the manner just described within member 22 may at all times be determined. The other duct 34a leads to pressure responsive means 36 which serve to adjust the tool that engages the work-piece, i. e. in the case of the illustrated mechanism the position of the grinding wheels 6 and 7 relative to each other.

Such pressure responsive means include an electrical contact device 37 (see Fig. 3), of the type known as a micro-switch, which is normally open but adapted to be closed by upward movement of the weighted diaphragm 38 whenever the pressure beneath such diaphragm builds up to a predetermined point, the position of switch 37 in relation to the diaphragm being adjustable by a set screw 39. As a result the electric circuit controlled by said switch will be closed whenever the pressure, which is built up in the member 22 by an increase in the diameter of the work-piece, exceeds a predetermined maximum.

The manner in which the relay circuit thus controlled by the pressure responsive device 36 is utilized to adjust the tool will of course depend upon the character of the latter. For use where two grinding wheels disposed as previously described are employed, the arrangement of tool adjusting device illustrated in Figs. 4 and 5 has been devised. As shown in said figures, each of the grinding wheels 6 and 7 is mounted so as to be adjustable axially of the corresponding drive shaft through the medium of a threaded shaft 40. Such threaded shaft is adapted to be rotated either manually or automatically through medium of a second shaft 41 connected therewith by suitable reduction gearing, e. g. pinion 42 which meshes with a large internal gear 43.

In addition to handle 44 for operating shaft 41, step-by-step rotation may be imparted to this shaft by means of a ratchet wheel 45 operated by a pawl 46 from a solenoid 47, the latter being included in the circuit controlled by the switch 37 in pressure responsive device 36. This circuit (see Fig. 1) includes a timing relay for the purpose of breaking the circuit after a predetermined number of seconds, so that the ratchet pawl 46 may return to its initial position. Then if switch 37 is still closed, due to above normal pressure beneath diaphragm 38, the closure of such timing relay will cause the ratchet pawl to be actuated again, and so on until the switch 37 is opened.

Each successive closing of such circuit will serve to swing the pawl 46 through a predetermined arc; however, the extent of the engagement of the pawl with the ratchet during such swinging movement is regulated by means of an adjustable shroud 48 so that the ratchet wheel 45, and thus the screw shaft 40, may be rotated through such degree as desired and so move the grinding wheel axially a correspondingly greater or lesser amount. In other words, the adjustment of such wheel can be made as fine as required depending upon how closely it is desired to hold the travelling work-piece to a given dimension.

It has been considered sufficient to illustrate in detail in Fig. 5 only one of these pawl and ratchet drives, viz. that associated with the upper grinding wheel 7, since the one associated with the lower grinding wheel will be substantially identical. Indeed the only difference will be in the threading of the shafts 40 one of which will be left hand, the other right. Instead of thus providing for the automatic axial adjustment of both grinding wheels 6 and 7, it may be in some cases sufficient to provide for the adjustment of one such wheel. However, since such adjustment is primarily designed to compensate for the wearing away of the grinding surfaces of the wheels and such wear will occur to approximately the same extent in the case of each wheel, both wheels should be simultaneously adjusted and to the same amount. Furthermore, if adjustment is confined to only one wheel the travelling wire or equivalent work-piece may be pushed out of its proper path or at least caused to bear against the wheel on one side more than on the other.

Adjustment of the grinding wheels 6 and 7 (or of either wheel alone where only one is adjustable) will of course cease the moment the diameter of the work-piece has been reduced to a point where the built-up pressure in tubular member 22 has been reduced so that the pressure responsive device 36 is no longer actuated to close the relay circuit which includes solenoid 43.

It will be understood that for the purpose of initial adjustment suitable manual means (not shown) for rotating the threaded shafts 40 and 45 will be provided.

The manner in which my improved dimension indicating and control device operates should be sufficiently clear from the description already given of the construction and operation of the component parts of such device and of the associated mechanisms, particularly the adjusting mechanism for the grinding wheels. In order to start the operation, a length of wire will be drawn from the supply reel 1, and after being passed through the several aligned devices will be wound up on take-up reel 2. Where a drawing step is involved, i. e. such wire is passed through a drawing die 4, such take-up reel constitutes in effect a drawing drum around which the wire may be wound a sufficient number of times to provide the necessary pull and thence be carried to a take-up reel. The gripper rolls 10, 10 of the oscillating device are then adjusted to engage such length of wire with sufficient friction to oscillate the same in the manner described, and the grinding wheels 6 and 7 will be adjusted so that as the wire passes therebetween while being thus oscillated it will be reduced to the desired diameter. A short section may require to be thus reduced by manual operation of the grinding wheels before setting the pressure responsive device 36, but once such reduced section has passed through the tubular member 22 the further operation becomes in effect automatic.

From the foregoing description it will be seen that my improved dimension indicating and control device is capable of operation in conjunction with a rapidly moving work-piece, the cross-sectional dimension of which is the object of interest. This is a result which so far as I am aware has not heretofore been obtained in any form in so-called pneumatic control. At the same time my improved device or apparatus is effective to control the dimension of such work-piece with any desired degree of refinement. Coupled with the foregoing are means for automatically stopping the entire mechanism if through accident or otherwise the means for dimensioning the work-piece should fail properly to function.

It will be understood that the work-piece need not be of indefinite length as in the case of a wire and my improved dimension indicating and control device still be capable of functioning in connection therewith, substantially as described in connection with such wire. Also such wire or other work-piece instead of being torsionally oscillated in order to present its entire circumferential surface to the tool may be oscillated bodily, or for that matter may be rotated. For such modified operation, the means already described may be utilized, as by passing a work-piece of discontinuous instead of indefinite length through the pressure chamber with its aligned die-openings. Finally, while the described pressure responsive means for adjusting the position of the tool are particularly designed for use in connection with grinding wheels disposed and mounted in the manner set forth, such means may be readily adapted for the adjustment of other types of tools.

However, the particular utility of my improved device is found in the surface conditioning, as by grinding, of a continuously moving strand such as a wire, since the device is capable of handling such a strand moving at a relatively high rate of speed, e. g. 100 feet per minute, not only with entire safety but with a capacity for finishing the strand to very close dimensions. Where, as in the production of fine wire, i. e. wire of small diameter, the strand which is to be drawn is initially surface conditioned in the manner described so as to remove superficial defects and render the diameter uniform with very small tolerance, the subsequent reduction of such strand may be carried out with assurance that a satisfactory product will result whereas under present conditions and not infrequently in the manufacture of fine wire it is found upon inspection that the product is imperfect after all of the expense of drawing the same has been incurred.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a device of the character described, the combination of a housing having a cylindrical bore, a tubular member fitted to such bore, a displaceable latch normally retaining said member in position, dies in the respective ends of said member providing aligned openings gauged to fit an elongated work-piece moving through the chamber thus formed in said member with a predetermined clearance where said work-piece is of desired cross-section, means for supplying fluid under pressure to such chamber, and pressure responsive means in communication with such chamber, said latch being displaceable to release said member from said bore upon excessive frictional engagement of such work-piece with said dies.

2. In a device of the character described, the combination of a housing having a cylindrical bore, a tubular member fitted to such bore and having an encircling groove intermediate of its ends and communicating with its interior, a spring-pressed latch engaging such groove to retain said member in position, dies in the respective ends of said member providing aligned openings gauged to fit an elongated work-piece moving through the chamber thus formed in said member with a predetermined clearance where said work-piece is of desired cross-section, said housing having pressure fluid supply and discharge passages communicating with such encircling groove when said member is thus positioned, and pressure responsive means connected with such fluid discharge passage, said latch being displaceable to release said member from said bore upon excessive frictional engagement of such work-piece with said dies.

3. In a device of the character described, the combination of a housing having a cylindrical bore, a tubular member fitted to such bore and having an encircling groove intermediate of its ends and communicating with its interior, a spring-pressed latch engaging such groove to retain said member in position, dies in the respective ends of said member providing aligned openings gauged to fit an elongated work-piece moving through the chamber thus formed in said member with a predetermined clearance where said work-piece is of desired cross-section, said housing having pressure fluid supply and discharge passages communicating with such encircling groove when said member is thus positioned, an adjustably mounted tool adapted to engage such work-piece in advance of its passage through such chamber, and pressure responsive means connected with such fluid discharge passage and adapted to adjust said tool, said latch being displaceable to release said member from said bore upon excessive frictional engagement of such work-piece with said dies.

4. In a device of the character described, the combination of a tubular member, dies in the respective ends of said member providing aligned openings gauged to fit an elongated work-piece moving through the chamber thus formed in said member with a predetermined clearance where said work-piece is of desired cross-section, means for supplying fluid under pressure to such chamber, pressure responsive means in communication with such chamber, said member being displaceable by excessive frictional engagement of such work-piece with said dies, and means operable by displacement of said member to stop movement of said work-piece.

5. In a device of the character described, the combination of a housing having a cylindrical bore, a tubular member fitted to such bore, a displaceable latch normally retaining said member in position, dies in the respective ends of said member providing aligned openings gauged to fit an elongated work-piece moving through the chamber thus formed in said member with a predetermined clearance where said work-piece is of desired cross-section, means for supplying fluid under pressure to such chamber, pressure responsive means in communication with such chamber, said latch being displaceable to release said member from said bore upon excessive frictional engagement of such work-piece with said dies, and means operable by displacement of said latch to stop movement of said work-piece.

6. In a device of the character described, the combination of a tubular member, dies in the respective ends of said member providing aligned openings gauged to fit an elongated work-piece moving through the chamber thus formed in said member with a predetermined clearance where said work-piece is of desired cross-section, means for supplying fluid under pressure to such chamber, pressure responsive means in communication with such chamber, an adjustably mounted grinding wheel adapted to engage such work-piece in advance of its passage through such chamber, adjustment of said wheel being controlled by said pressure responsive means, said member being displaceable by excessive frictional engagement of such work-piece with said dies, and means operable by displacement of said member to interrupt operation of said grinding wheel.

7. In a device of the character described, the combination of a fluid pressure chamber having aligned openings gauged to fit an elongated work-piece moving through said chamber with a predetermined clearance where such work-piece is of desired cross-section, a grinding wheel adapted to laterally engage such work-piece in advance of its passage through said chamber, said grinding wheel being axially adjustable, means including a ratchet wheel adapted to move said grinding wheel towards the work-piece, a pawl adapted to impart step-by-step rotative movement to said ratchet wheel, and electro-magnetic means responsive to an increase of pressure in said chamber adapted to actuate said pawl.

8. In a device of the character described, the combination of a fluid pressure chamber having aligned openings gauged to fit an elongated work-piece moving through said chamber with a predetermined clearance where such work-piece is of desired cross-section, means adapted to oscillate the work-piece about its axis as it thus moves, a grinding wheel adapted to laterally engage such work-piece in advance of its passage through said chamber, said grinding wheel being axially adjustable, means including a ratchet wheel adapted to move said grinding wheel towards the work-piece, a pawl adapted to impart step-by-step rotative movement to said ratchet wheel, and electro-magnetic means responsive to an increase of pressure in said chamber adapted to actuate said pawl.

9. In a device of the character described, the combination of a fluid pressure chamber having aligned openings gauged to fit an elongated work-piece moving through said chamber with a predetermined clearance where such work-piece is of desired cross-section, means adapted to oscillate the work-piece about its axis as it thus moves, two grinding wheels having overlapping lateral faces disposed to engage such work-piece between them in advance of its passage through said chamber, said grinding wheels being axially adjustable, and means responsive to an increase of pressure in said chamber adapted simultaneously to move both said grinding wheels towards such work-piece.

10. In a device of the character described, the combination of a fluid pressure chamber having aligned openings gauged to fit an elongated work-piece moving through said chamber with a predetermined clearance where such work-piece is of desired cross-section, means adapted to oscillate the work-piece about its axis as it thus moves, two grinding wheels having overlapping lateral faces disposed to engage such work-piece between them in advance of its passage through said chamber, said grinding wheels being axially adjustable, means including a ratchet wheel adapted simultaneously to move both said grinding wheels towards such work-piece, a pawl adapted to impart step-by-step rotative movement to said ratchet wheel, and electro-magnetic means responsive to an increase of pressure in said chamber adapted to actuate said pawl.

11. In a device of the character described, the combination of a fluid-pressure chamber having aligned openings gauged to fit an elongated work-piece moving through said chamber with a predetermined close clearance where such work-piece is of desired cross-section, said chamber being of substantially larger cross-section than such work-piece and being displaceable upon excessive frictional engagement of the latter with such openings, and means operable by displacement of said chamber to stop movement of said work-piece.

12. In a device of the character described, the combination of a fluid-pressure chamber having aligned openings gauged to fit an elongated work-piece moving through said chamber with a predetermined close clearance where such work-piece is of desired cross-section, said chamber being of substantially larger cross-section than such work-piece and being displaceable upon excessive frictional engagement of the latter with such openings, means operable by displacement of said chamber to stop movement of said work-piece, and fluid-pressure responsive indicating means in free communication with said chamber.

13. In a device of the character described, the combination of a fluid-pressure chamber having aligned openings gauged to fit an elongated work-piece moving through said chamber with a predetermined close clearance where such work-piece is of desired cross-section, said chamber being of substantially larger cross-section than such work-piece and being displaceable upon excessive frictional engagement of the latter with such openings, means operable by displacement of said chamber to stop movement of said work-piece, an adjustably mounted tool adapted to engage such work-piece in advance of its passage through said chamber, and fluid-pressure responsive control means for adjusting said tool, said means being in free communication with said chamber.

NORMAN H. NYE.